United States Patent [19]
Maeda

[11] Patent Number: 5,485,452
[45] Date of Patent: Jan. 16, 1996

[54] OPTICAL INFORMATION RECORDING MEDIUM

[75] Inventor: Takanori Maeda, Tokorozawa, Japan

[73] Assignee: Pioneer Electronic Corporation, Tokyo, Japan

[21] Appl. No.: 318,485

[22] Filed: Oct. 5, 1994

Related U.S. Application Data

[63] Continuation of Ser. No. 37,660, Mar. 24, 1993, abandoned, which is a continuation-in-part of Ser. No. 804,585, Dec. 10, 1991, abandoned.

[30] Foreign Application Priority Data

Jun. 28, 1991 [JP] Japan ..................... 3-158914

[51] Int. Cl.$^6$ ................................ G11B 7/24
[52] U.S. Cl. ............... 369/284; 369/286; 369/288; 369/275.1; 346/135.1
[58] Field of Search ............... 369/275.1–275.5, 369/109, 284, 286, 288, 13; 346/135.1; 430/945; 428/698

[56] References Cited

U.S. PATENT DOCUMENTS

| | | | |
|---|---|---|---|
| 4,612,587 | 9/1986 | Kaneko et al. | 369/13 |
| 4,725,502 | 2/1988 | Kiyomiya et al. | 428/694 |
| 4,927,681 | 5/1990 | Chikuma | 346/135.1 |
| 4,969,141 | 11/1990 | Takaoka et al. | 430/945 |
| 5,075,145 | 12/1991 | Yamamoto et al. | 346/135.1 |
| 5,079,135 | 1/1992 | Matsuzawa et al. | 430/945 |
| 5,093,174 | 3/1992 | Suguki et al. | 430/945 |

FOREIGN PATENT DOCUMENTS

| | | |
|---|---|---|
| 3741910 | 6/1988 | Germany. |
| 58-137147 | 8/1983 | Japan. |
| 62-141656 | 6/1987 | Japan. |
| 63-066543 | 3/1988 | Japan. |
| 63-220434 | 9/1988 | Japan. |
| 2017379 | 10/1979 | United Kingdom. |

OTHER PUBLICATIONS

H. A. Macleod, Thin–Film Optical Filters, second edition, pp. 464–467, Adam Hiiger, Techno House, Bristol England, 1986.

R. Kingslake, Applied Optics and Optical Engineering, vol. 1, Light: Its Generation and Modification, pp. 304–307, Academic Press, New York, 1965.

P. Yeh, Optical Waves in Layered Media, pp. 154–155, John Wiley & Sons, New York, 1988.

*Primary Examiner*—Hoa T. Nguyen
*Attorney, Agent, or Firm*—Keck, Mahin & Cate

[57] ABSTRACT

An optical information recording medium configured to prevent signal reproduction due to intermodulation as well as to ensure a compatibility to players that involve read lights with different wavelengths and improved data transfer rate with higher information recording density. The optical information recording medium comprises a first recording layer for reflecting first incident light of a first wavelength to change an optical characteristic thereof and passing second incident light of a second wavelength different from the first wavelength, and a second recording layer for reflecting the second incident light to change an optical characteristic thereof, the first recording layer and the second recording layer are laminated in the order of the first and second recording layers from a side where the first incident light enters.

5 Claims, 4 Drawing Sheets

OPTICAL INFORMATION RECORDING MEDIUM

This is a continuation application of Ser. No. 08/037,660, filed Mar. 24, 1993, now abandoned, which is a continuation-in-part application of Ser. No. 07/804,585, filed Dec. 10, 1991, now abandoned.

BACKGROUND OF THE INVENTION

1. Field of the Invention

The present invention relates to an optical information recording medium.

b 2. Description of Background Information

FIG. 1 illustrates a cross sectional view of a conventional RO (Read Only) type optical disk and shows the manner of irradiation of a read light beam on the optical disk.

In this diagram an optical disk 101 comprises a transparent plastic substrate 102 formed of, for example, a polycarbonate resin, with one main surface of the substrate 102 serving as an information recording surface. On this information recording surface is formed a reflecting film 104 which reflects incident read light coming from an objective lens 103. The reflecting film 104, formed by vapor deposition of aluminum, for example, is sandwiched between the substrate 102 and a protective layer 105.

The information recording surface of the conventional so-called optical disk, like the reflecting film 104, has a reflection characteristic as shown in, for example, FIG. 2, which responds to incident read light of a relatively wide range of wavelengths. FIG. 2 illustrates a wavelength-dependent characteristic of a reflectance in the case of aluminum (Al) used for the reflecting film, wherein the horizontal scale $\lambda 1$ (nm) represents the wavelength of incident light and the vertical scale I (%) the reflectance to the incident light.

When recorded information is reproduced from an optical disk designed for long wavelength incident light, and the reproducing apparatus which uses incident read light of a short wavelength (which is used for the purpose of achieving a higher density), the read signal level will drop and intermodulation will occur, making it difficult to realize good signal reproduction. Due to high density signal recording, a disk having information recorded thereon by incident read light having a specific wavelength as a standard can only be played by the players of such a standard, ensuring no disk compatibility.

OBJECT AND SUMMARY OF THE INVENTION

It is therefore an object of the present invention to provide an optical information recording medium which ensures good signal reproduction without causing any intermodulation as well as a compatibility to players of different specifications.

An optical information recording medium according to the present invention comprises a first recording layer for reflecting first incident light of a first wavelength to change an optical characteristic thereof and transmitting second incident light of a second wavelength different from the first wavelength; and a second recording layer for reflecting the second incident light to change an optical characteristic thereof, the first recording layer and the second recording layer are laminated in the order of said first recording layer and second recording layer from a side where said first incident light enters.

The optical information recording medium with the above structure permits the first recording layer to reflect the first incident light of the first wavelength to change its optical characteristic and to transmit the second incident light of the second wavelength different from the first wavelength, and permits the second recording layer laminated on the first recording layer to reflect the second incident light to change its optical characteristic.

DETAILED DESCRIPTION OF THE PREFERRED EMBODIMENT

Figure 3:
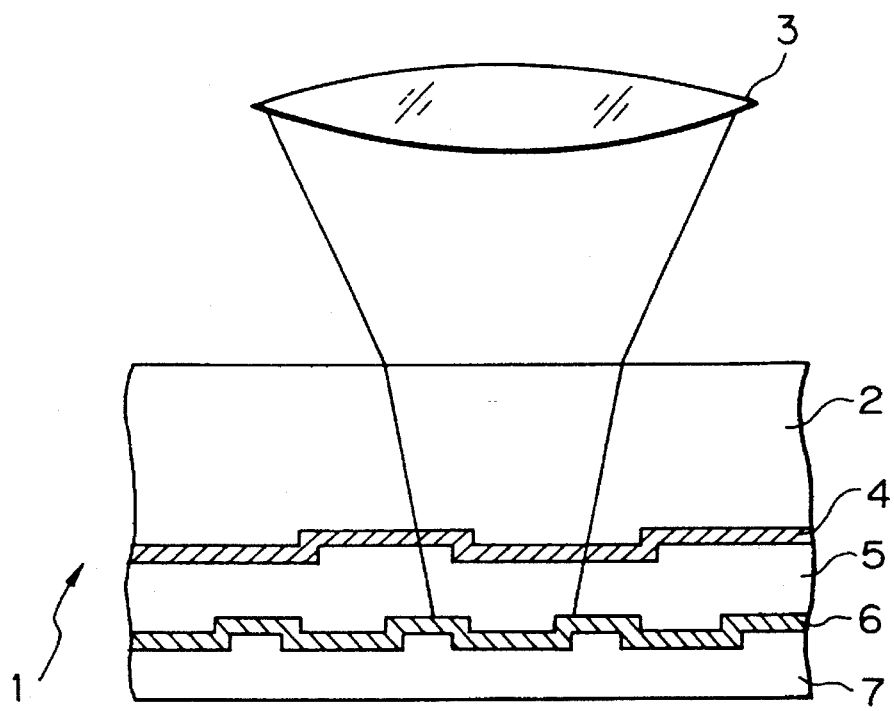
FIG. 3 is a diagram showing a cross-sectional view of an optical disk according to one embodiment of the present invention, and showing the manner of irradiation of an incident,read light on the optical disk.

FIG. 3 illustrates the cross-sectional view of an optical disk according to one embodiment of the present invention, and the manner of irradiation of an incident read light on this disk.

An optical disk 1 has a transparent plastic substrate 2 formed of a first medium, such as a polycarbonate resin, as a first transparent support layer. One main surface of this substrate 2 serves as a first information recording surface. Information signals which can be reproduced by incident read light with a long wavelength of, for example, $\lambda 1=780$ nm, i.e., pits, in the form of depressions and bumps, are formed on the first information recording surface for recording. A first reflecting film 4 of monolayer or multilayer construction is deposited on the first information recording surface to serve, together with the transparent support layer, as a first recording layer. The first reflecting film 4 has a characteristic for transmitting incident light of a short wavelength of, for example, $\lambda 2=300$ nm while reflecting the incident light of the wavelength $\lambda 1$. The reflecting film 4, typically formed of silver, $MgF_2$, $TiO_2$ or $SiO_2$, (which are non-magnetic materials) is sandwiched between the substrate 2 made of the first medium and a second transparent support layer 5.

The second transparent support layer 5 is made of a second medium, such as a polycarbonate resin, which has an equivalent refractive index as the first information recording surface, or the first medium used for the plastic substrate 2. One main surface of the second transparent support layer 5 is used as a second information recording surface. Information signals which can be reproduced by an incident readout light with a short wavelength of, for example, $\lambda 2=300$ nm i.e., pits, in the form of depressions and bumps, are formed on the second information recording surface for recording. A second reflecting film 6 of monolayer or multilayer construction is deposited on the second information recording surface to serve, together with the transparent support layer 5, as a second recording layer. The second reflecting film 6 has a characteristic for reflecting the incident light of the short wavelength $\lambda 2$. The reflecting film 6, formed by vapor deposition of aluminum or the like, is sandwiched between the second transparent support layer 5 and a protective layer 7.

Figure 4:
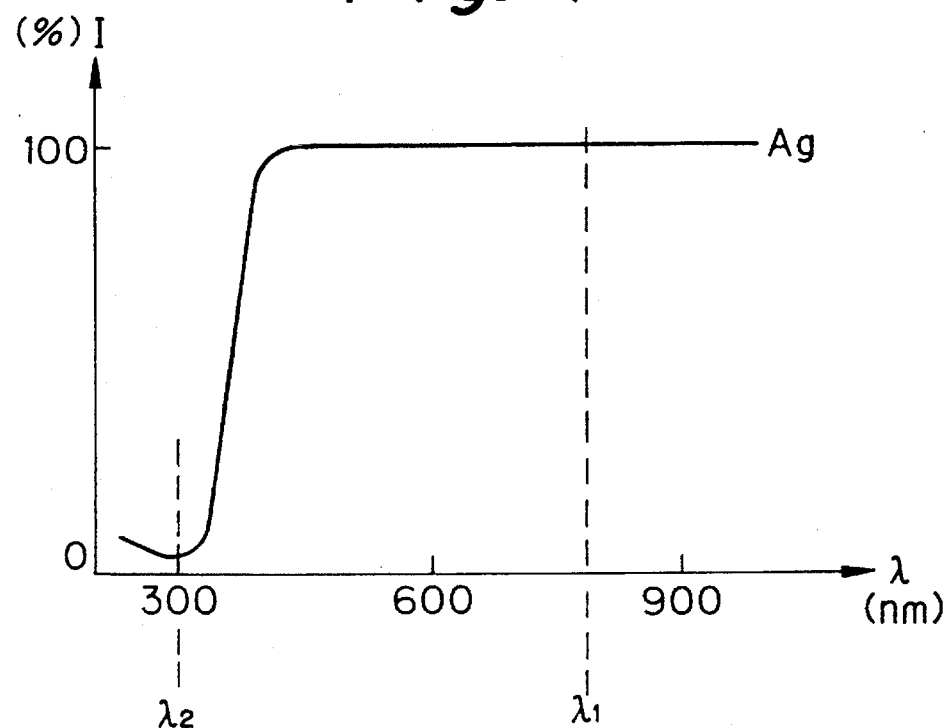
FIG. 4 is a diagram showing the characteristic of the wavelength dependency of the reflectance of a first reflecting film in the embodiment in FIG. 3.

FIG. 4 shows the reflectance characteristic of a thin silver (Ag) film, which satisfies the requirements of the first reflecting film 4, with respect to the wavelength of incident light. The horizontal line $\lambda$ (nm) in the graph represents the wavelength of incident light to be irradiated on the thin silver film, while the vertical line I (%) represents the ratio of the amount of reflected light to the amount of incident light, or the reflectance. As apparent from the characteristic curve, the thin silver film shows the minimum reflectance of 5% with respect to incident light with a wavelength 80 of 300 nm, and hardly reflects the light, while it shows an almost 100% reflectance to incident light with a wavelength $\lambda$ of approximately over 400 nm, causing full reflection of the incident light.

Figure 1:
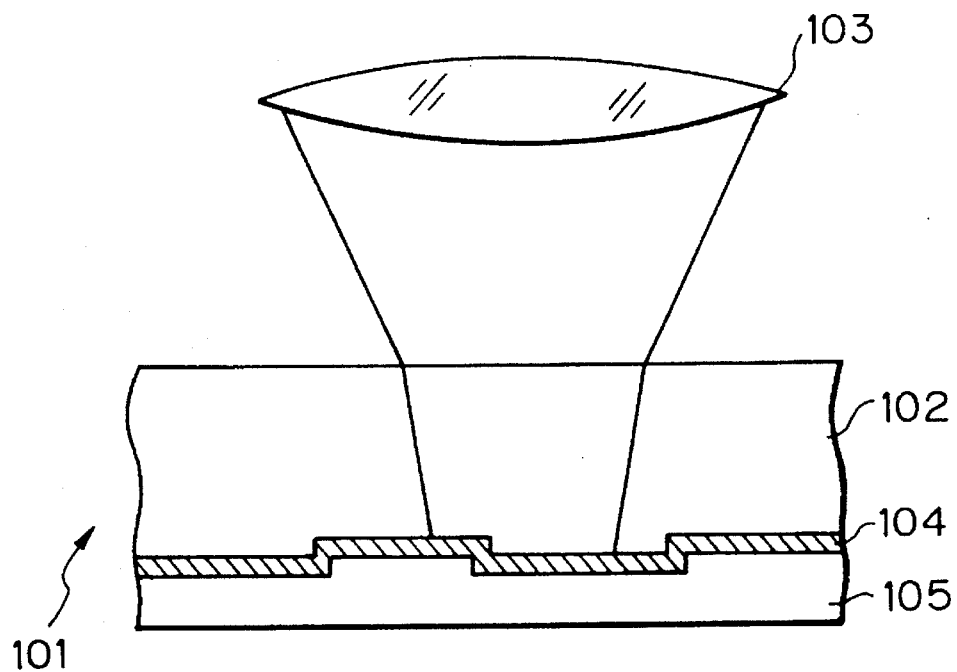
FIG. 1 is diagram illustrating a cross-sectional view of a conventional optical disk and showing the manner of irradiation of an incident read light on the optical disk.
Figure 2:
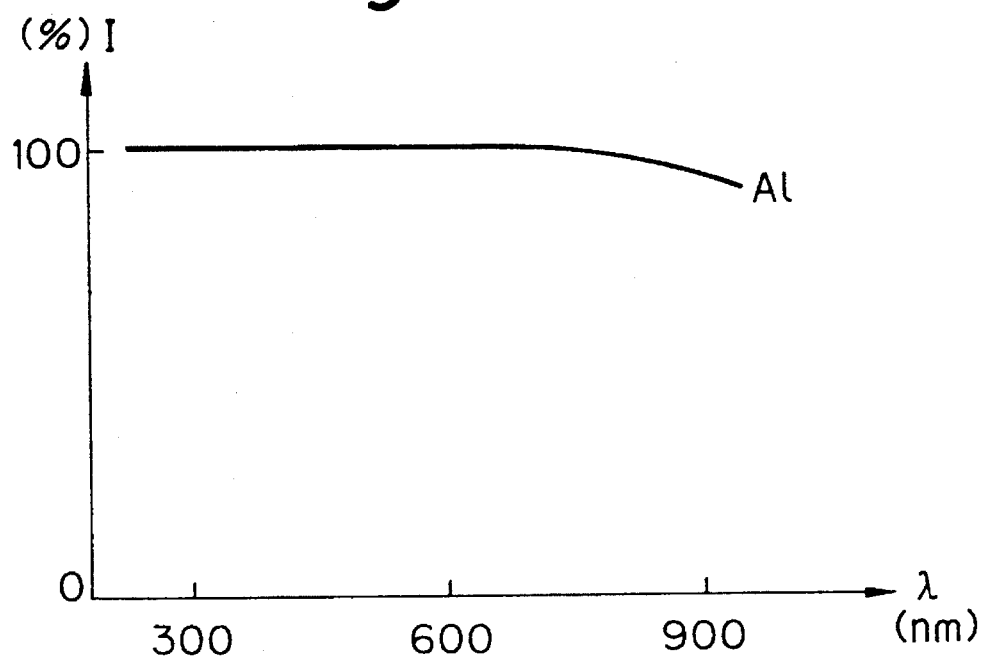
FIG. 2 is a diagram illustrating the characteristic of the wavelength dependency of the reflectance of a reflecting film on the conventional optical disk.

If this thin silver film is used as the reflecting film 4, the information recording surface can therefore reflect the incident light with the above-described long wavelength of $\lambda 1=780$ nm and can transmit the incident light with the aforementioned short wavelength of $\lambda 2=300$ nm. If the second reflecting film 6 is formed of aluminum having such a property to almost completely reflect incident light with the broad range of wavelength as shown in FIG. 2, the reflecting film 6 will be able to reflect the incident light with the short wavelength $\lambda$ which is transmitted through the substrate 2, the reflecting film 4 and the support layer 5. The reflectance is determined in accordance not only with the reflection characteristic of a single material, such as aluminum or silver as previously mentioned, but also with the film thickness of that material or the amount of a compound to be added. The reflectance of the reflecting film formed of $MgF_2$, $TiO_2$ or $SiO_2$ also changes in accordance with the wavelength of incident light.

The first and second media, formed of a polycarbonate resin, have an equivalent reflectance and the reflecting film 4 formed in-between is very thin. The incident light with the wavelength $\lambda 2$ is therefore almost linearly irradiated on the second information recording surface. It is possible to exactly and efficiently reflect the incident light by means of the second reflecting film 6 which has a high reflectance with respect to that light having the short wavelength so as to read an information signal more accurately with less errors.

The schematic structure of a read optical system for reproducing the optical disk will now be described.

Figure 5:
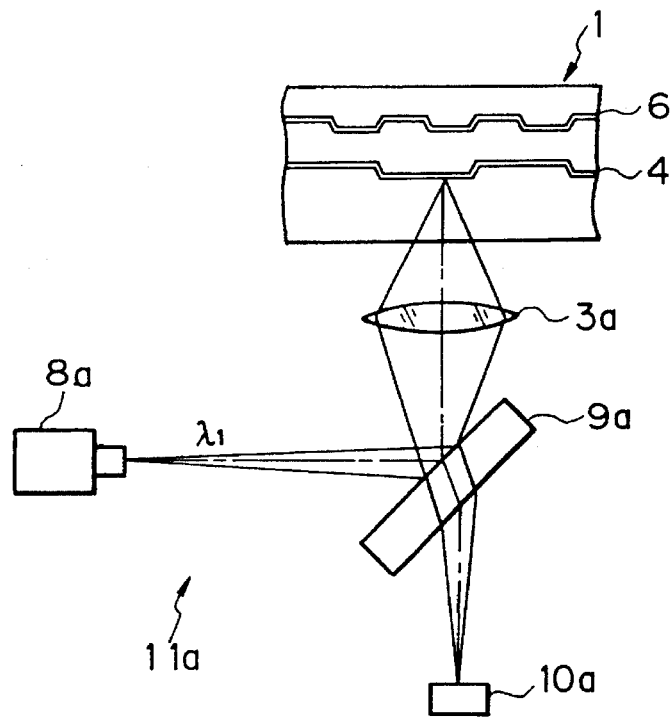
FIG. 5 is a block diagram showing an optical system with a first structure for reproducing the optical disk of the present invention.

FIG. 5 is a block diagram showing a first structure of the optical system which reads an information signal from the first information recording surface. Identical reference numerals are used in FIG. 5 to indicate elements corresponding to those in FIG. 3. A laser device 8a emits a laser beam of a long wavelength $\lambda 1$ to a beam splitter 9a, which in turn guides this beam to and through an objective lens 3a to irradiate the first reflecting film 4 of the optical disk 1. Since the reflecting film 4 reflects incident light with a long wavelength $\lambda 1$, the reflecting film 4 reflects the incident light to the beam splitter 9a through the objective lens 3a in accordance with the information signal recorded on the first information recording surface. The beam splitter 9a separates the incident light from the laser device 8a from the reflected light from the optical disk 1, a so-called polarizing beam splitter or half mirror is used for it. Reflected light which has been transmitted through the beam splitter 9a is supplied as an optical read signal to a photodetector 10a. The first optical read system 11a is structured in this manner.

Figure 6:
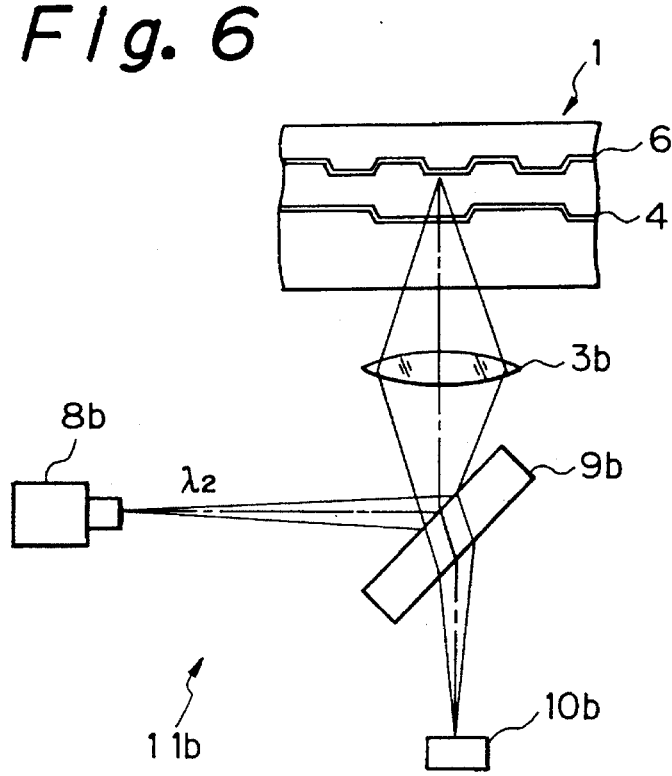
FIG. 6 is a block diagram showing an optical system with a second structure for reproducing the optical disk of the present , invention.

FIG. 6 is a block diagram showing the optical system with a second structure which reads an information signal on the second information recording surface. A second optical read system 11b is almost the same as the first optical read system 11a shown in FIG. 5 whose laser device 8a is replaced with a laser device 8b which emits a laser beam with a short wavelength $\lambda 2$. A beam splitter 9b, an objective lens 3b and a photodetector 10b function the same as the corresponding elements 9a, 3a and 10a in FIG. 5. Light entering the optical disk 1 has the short wavelength $\lambda 2$ and is transmitted through the first reflecting film 4 and then reflected by the second reflecting film 6. The incident light is therefore to be reflected toward the beam splitter 9b through the objective lens 3b in accordance with the information signal recorded on the second information recording surface.

According to the optical disk of this invention, even the first optical read system 11a which uses incident read light of the long wavelength $\lambda 1$ and the second optical read system 11b which uses incident read light of the short wavelength $\lambda 2$ are separately installed on two disk players, the optical disk has information recording surfaces associated with those wavelengths, so that both players can play the same disk for information reproduction. It is therefore possible to prevent intermodulation due to the different wavelengths involved as well as to achieve the compatibility to different disk players utilizing incident read lights of different wavelengths. The information tracks on the first and second information recording surfaces should not necessarily be provided at corresponding positions.

Figure 7:
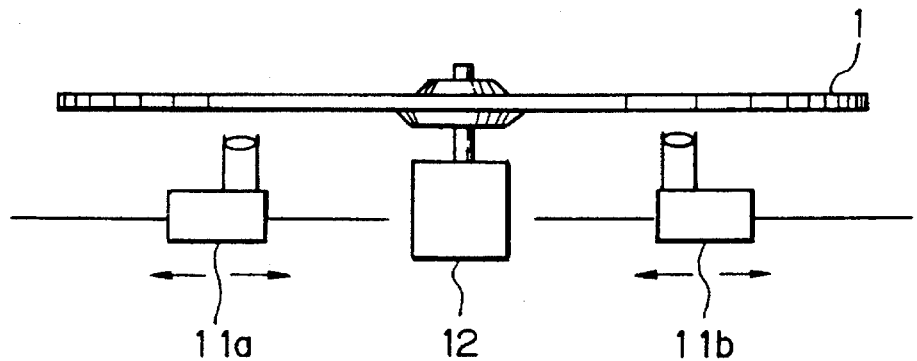
FIG. 7 is a block diagram showing an optical system with a third structure for reproducing the optical disk of the present invention.

FIG. 7 presents a block diagram of an optical system having a third structure designed to have two optical read systems or two types of pickups like the optical systems 11a and 11b installed in a single player to allow information signals to be read from the first and second information recording surfaces simultaneously.

A spindle motor 12 is controlled by a spindle servo system (not shown) to rotate the disk 1. The optical read system for reading an information signal with a long wavelength, such as the first optical read system 11a, is provided on one side of the spindle motor 12, and another optical read system for a signal with a short wavelength, such as the second optical system 11b, is provided on the other side of the motor 12, for example, at a position radially opposed from the optical system 11a. These optical systems are shiftable in the radial direction of the disk, and their positions are controlled by a tracking servo system and a feed servo system (both not shown) which are provided for coarse and fine adjustments.

The optical system with this structure can therefore read two kinds of information signals from two information recording surfaces at the same time, serving to accelerate data transfer from one information recording medium.

Figure 8:
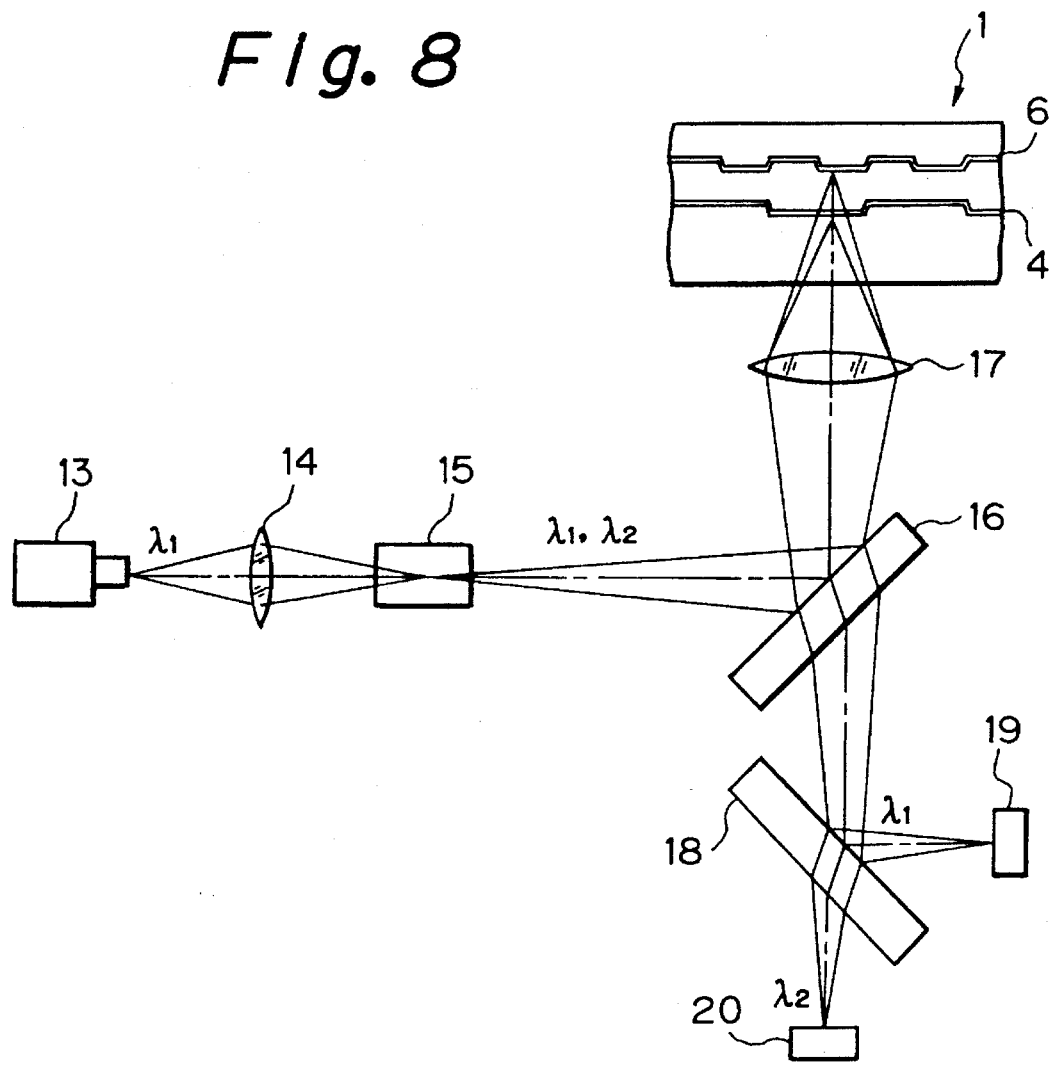
FIG. 8 is a block diagram showing an optical system with a fourth structure for reproducing the optical disk of the present invention.

A disk player with such a structure usually needs two pickups to read two information signals. FIG. 8 is a block diagram illustrating an optical system with a fourth structure which can read both first and second information signals by a single pickup (information read point).

A laser device 13 outputs a laser beam with a long wavelength $\lambda 1$, which enters a nonlinear optical element 15 through a coupling lens 14. The nonlinear optical element 15 converts the long wavelength $\lambda 1$ into a short wavelength $\lambda 2$. With an SHG (Second Harmonic Generator) as the nonlinear optical element 15, for example, $\lambda 2=\lambda 1/2$ The laser beam, after passing through the nonlinear optical element 15, reaches a beam splitter 16 as so-called mixed light consisting of the light with the wavelength $\lambda 1$ and the light with the wavelength $\lambda 2$. The beam splitter 16 reflects the mixed light to the objective lens 17. The objective lens 17 has an optical characteristic such that the focal distance for the incident light with the wavelength $\lambda 2$ is longer than that for the incident light with the wavelength $\lambda 1$. The objective lens 17 is therefore formed and placed so that the lights with the wavelengths $\lambda 1$ and $\lambda 2$ can be focused respectively on the first information recording surface of the disk 1, that is, the reflecting film 4 and the second information recording surface, that is, the reflecting film 6.

In other words, the light with the long wavelength $\lambda 1$ is reflected in focus at the reflecting film 4, and the light with the short wavelength $\lambda 2$ is transmitted through the reflecting film 4 to be reflected in focus at the reflecting film 6. These reflected lights are guided in the direction of the optical axis again by the beam splitter 16 as shown in FIG. 8, reaching a beam splitter 18. The beam splitter 18, made of, for example, glass coated with multi-layered films, reflects the light with the wavelength $\lambda 1$, and transmits the light with the wavelength $\lambda 2$. The lights with the wavelengths $\lambda 1$ and $\lambda 2$ after separated by the beam splitter 18 are sent to photodetectors 19 and 20, respectively. In accordance with the amounts of received lights, the photodetectors 19 and 20 simultaneously detect information signals on the respective first and second information recording surfaces on the disk 1.

The above-structured disk player not only has an effect of improving the data transfer rate like the above-described disk player having two pickups, but also reads information from a plurality of information recording surfaces With a single pickup. The disk player with the fourth structure therefore needs fewer components than the type which reads information with a plurality of pickups, thus contributing to reduction of the manufacturing cost. With the structure like the fourth one where the actuator for the objective lens is shared in reading information from a plurality of information recording surfaces, the positions of information tracks should be specified to correspond with each other in a disk fabricating process.

Though the condition of $\lambda 1>\lambda 2$ has been adopted in the embodiment described above, the condition $\lambda 1<\lambda 2$ is also allowable so that the first information recording surface may be used for recording light with a short wavelength and the reflecting film 4 may be designed to transmit light with a long wavelength $\lambda 1$. The foregoing description of this embodiment has been given with reference to the case where two information recording surfaces are used to provide a double-layered structure. The structure is not limited to this particular type and, based on the same principle as that of the structure, it may have a multi-layered structure where a plurality of recording layers corresponding to the wavelengths of incident lights to be reflected are laminated in the order of the magnitudes of the wavelengths. This can permit fabrication of a recording disk which can have more types of recording means and reproducing means, thus improving its compatibility to different players, and which can record a greater amount of information with a higher density.

As described above in detail, the information recording medium according to the present invention is designed to reflect the first incident light with the first wavelength at the first recording layer to change the optical characteristic of the light, transmit the second incident light with the second wavelength different from the first wavelength, and reflect the second incident light at the second recording layer formed on the first recording layer to change the optical characteristic of the second incident light. It is therefore possible to prevent signal reproduction due to intermodulation, fabricate an optical information recording medium compatible to players which have read lights with different wavelengths, and contribute to the improvement of the information recording density and data transfer rate.

What is claimed is:

1. An optical information recording medium comprising: a first recording layer having a first transparent support layer having a first surface on which pits representing recorded information are formed and a thin silver film formed on said first surface of said first transparent support layer, said thin silver film reflecting a first incident light of a first wavelength and transmitting a second incident light of a second wavelength different from the first wavelength; and a second recording layer having a second transparent support layer having a second surface on which pits representing recorded information are formed and a thin aluminum film formed on said second surface of said second transparent support layer, said thin aluminum film reflecting the second incident light, the first recording layer and the second recording layer being laminated in the order of the first recording layer and second recording layer from a side where the first incident light enters.

2. An optical information recording medium having a first side comprising a first transparent support layer having a first information recording surface;

a first reflecting layer formed on the first transparent support layer and together therewith forming a first recording layer for reflecting a first light incident from said first side, said first light having a first wavelength, and said first reflecting layer transmitting a second light incident from said first side, said second light having a second wavelength different from the first wavelength;

a second support layer having a second information recording surface; and a second reflecting layer formed on the second transparent support layer and together therewith forming a second recording layer for reflecting the second light;

wherein the first recording layer and the second recording layer are laminated together and the first reflecting layer is made of a material selected from the group consisting of Ag, $MgF_2$, $TiO_2$, and $SiO_2$.

3. An optical information recording medium having a first side comprising:

a first transparent support layer having a first information recording surface;

a first reflecting layer formed on the first transparent support layer and together therewith forming a first recording layer for reflecting a first light incident from said first side, said first light having a first wavelength, and said first reflecting layer transmitting a second light incident from said first side, said second light having a second wavelength different from the first wavelength;

a second support layer having a second information recording surface; and a second reflecting layer formed on the second transparent support layer and together therewith forming a second recording layer for reflecting the second light;

wherein the first recording layer and the second recording layer are laminated together and the second reflecting layer is made of Al.

4. An optical information recording medium having a first side comprising:

a first recording layer for reflecting a first light incident from said first side to change an optical phase characteristic thereof, said first light having a first wavelength and said first recording layer transmitting a second light incident from said first side having a second wavelength different from the first wavelength; and a second recording layer laminated on the first recording layer for reflecting the second light to change an optical phase characteristic thereof;

the first recording layer further comprising a first transparent support layer having a first information recording surface and a first reflecting layer formed on the first information recording surface;

wherein the first reflecting layer is made of a material selected from the group consisting of Ag, $MgF_2$, $TiO_2$ and $SiO_2$.

5. An optical information recording medium having a first side comprising:

a first recording layer for reflecting a first light incident from said first side to change an optical phase characteristic thereof, said first light having a first wavelength and said first recording layer transmitting a second light incident from said first side having a second wavelength different from the first wavelength; and a second recording layer laminated on the first recording layer for reflecting the second light to change an optical phase characteristic thereof;

the second recording layer further comprising a second transparent support layer having a second information recording surface and a second reflecting layer formed on the second information recording surface;

wherein the second reflecting layer is made of Al.

* * * * *